(12) United States Patent
Dieterich et al.

(10) Patent No.: US 6,950,447 B2
(45) Date of Patent: Sep. 27, 2005

(54) METHOD AND APPARATUS FOR ANALYZING AND MONITORING PACKET STREAMS

(75) Inventors: Charles Benjamin Dieterich, Kingston, NJ (US); Arthur Lee Greenberg, Anandale, NJ (US)

(73) Assignee: Sarnoff Corporation, Princeton, NJ (US)

( * ) Notice: Subject to any disclaimer, the term of this patent is extended or adjusted under 35 U.S.C. 154(b) by 922 days.

(21) Appl. No.: 09/783,804

(22) Filed: Feb. 15, 2001

(65) Prior Publication Data

US 2001/0036201 A1 Nov. 1, 2001

Related U.S. Application Data

(63) Continuation of application No. 08/816,457, filed on Mar. 12, 1997, now Pat. No. 6,233,256.
(60) Provisional application No. 60/013,361, filed on Mar. 13, 1996.

(51) Int. Cl.$^7$ ................................................. H04J 3/06
(52) U.S. Cl. .................................... 370/516; 375/372
(58) Field of Search ................................ 370/252, 253, 370/395.6, 395.4, 395.1, 517, 516, 506, 505, 503, 468, 474, 473; 713/400, 502; 709/236; 725/87, 98, 151; 714/20; 375/371, 240, 25, 354, 372; 348/500, 362, 497, 464

(56) References Cited

U.S. PATENT DOCUMENTS

| | | | |
|---|---|---|---|
| 4,775,973 A | | 10/1988 | Tomberlin et al. ............. 370/60 |
| 4,887,260 A | | 12/1989 | Carden et al. ................. 370/60 |
| 5,212,724 A | | 5/1993 | Nazarenko et al. ............ 379/58 |
| 5,323,426 A | * | 6/1994 | James et al. ................. 370/505 |
| 5,394,395 A | * | 2/1995 | Nagai et al. ................. 370/395.4 |
| 5,430,485 A | * | 7/1995 | Lankford et al. ............. 348/423.1 |
| 5,467,342 A | * | 11/1995 | Logston et al. ............. 370/395.6 |
| 5,521,927 A | * | 5/1996 | Kim et al. ..................... 370/474 |
| 5,535,216 A | * | 7/1996 | Goldman et al. ............. 370/503 |
| 5,559,999 A | * | 9/1996 | Maturi et al. ................. 713/400 |
| 5,565,924 A | * | 10/1996 | Haskell et al. ............... 370/516 |
| 5,640,388 A | * | 6/1997 | Woodhead et al. .......... 370/468 |
| 5,668,841 A | * | 9/1997 | Haskell et al. ............... 370/516 |
| 5,694,397 A | * | 12/1997 | Burton ......................... 370/516 |
| 5,767,746 A | * | 6/1998 | Dieterich ...................... 375/376 |
| 5,768,326 A | * | 6/1998 | Koshiro et al. ............... 375/376 |
| 5,790,543 A | * | 8/1998 | Cloutier ........................ 370/252 |
| 5,881,114 A | * | 3/1999 | Moon ........................... 375/253 |
| 6,233,256 B1 | * | 5/2001 | Dieterich et al. ............ 370/506 |

OTHER PUBLICATIONS

Copy of International Search Report dated Jun. 9, 1997, from corresponding International Application No. PCT/US97/04009.

* cited by examiner

*Primary Examiner*—Duc Ho
*Assistant Examiner*—Phuongchau Ba Nguyen
(74) *Attorney, Agent, or Firm*—William J. Buirke

(57) ABSTRACT

A method and apparatus for analyzing and monitoring packet streams in "real time". The packet analyzer comprises an input buffer, a real-time analysis unit, a non-real-time analysis unit, a graphics unit, a monitor and a flushing circuit. A packet stream is received into the input buffer where the data is either read by the real-time analysis unit or flushed by the flushing circuit. Messages are passed between the real-time analysis unit and the non-real-time analysis unit to report on detected errors or to update packet stream information. In turn, real time packet stream information are displayed and updated on a display via the graphic unit. A method of detecting framing errors in a packet stream is incorporated by setting a 9th bit in the input buffer for each byte of data in a packet.

6 Claims, 10 Drawing Sheets

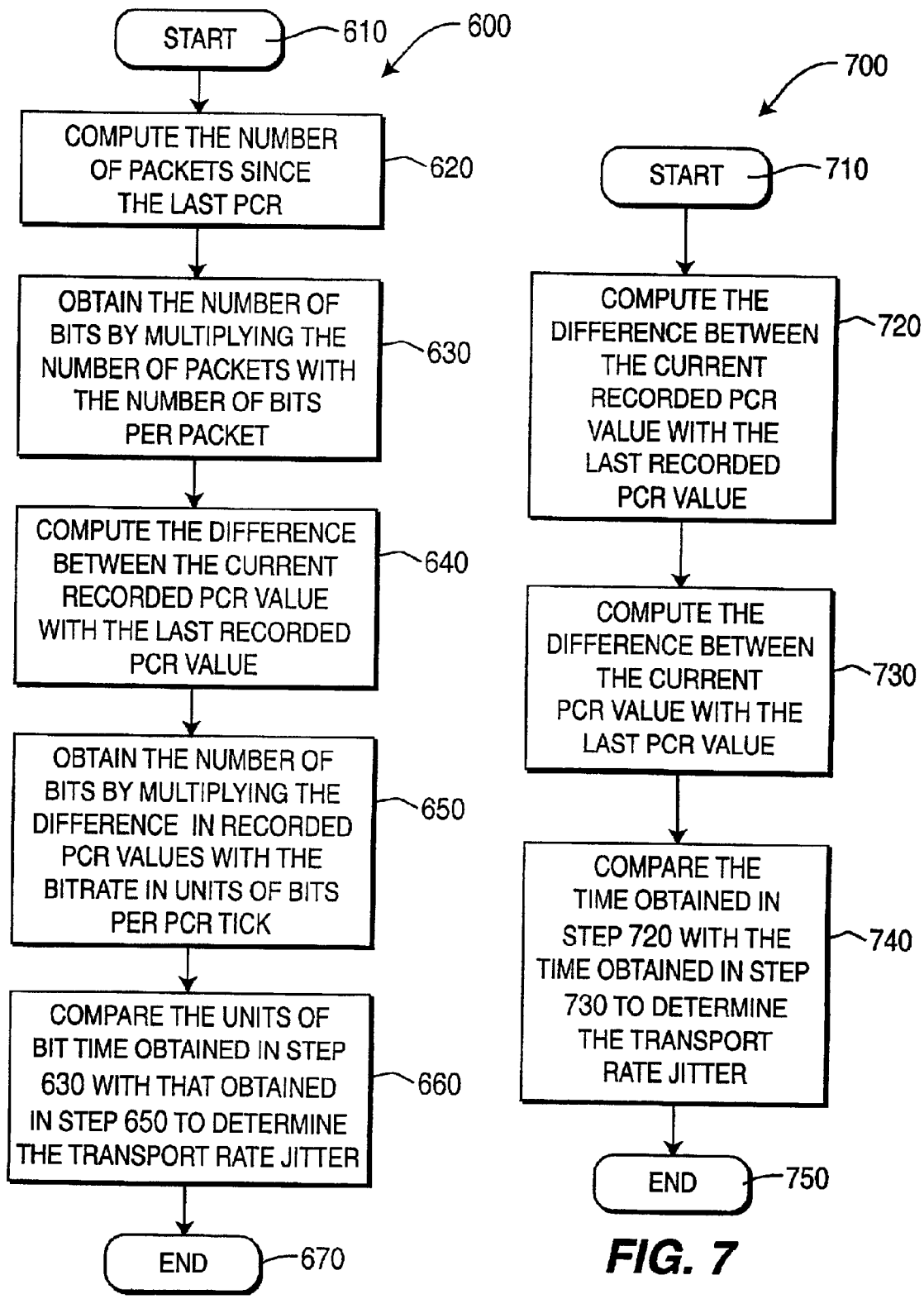

METHOD AND APPARATUS FOR ANALYZING AND MONITORING PACKET STREAMS

This application is a continuation of U.S. application Ser. No. 08/816,457, filed on Mar. 12, 1997, U.S. Pat. No. 6,233,256 issued May 15, 2002 which claims the benefit of U.S. Provisional Application No. 60/013,361 filed March 13, 1996.

The present invention relates to an apparatus and concomitant method for analyzing and monitoring packet streams in a communication system. More particularly, this invention relates to a method and apparatus that evaluates transport packet streams in "real time" for detecting errors, verifying the consistency of time base information and displaying important packet stream information.

BACKGROUND OF THE INVENTION

The increasing demand for digital video/audio information presents an ever increasing problem of monitoring the transmission or storage of data in data communication. As the transmission bandwidth increases in response to greater demand, it becomes increasingly more difficult to monitor the enormous amount of transmitted information in real time.

Generally, the data streams contain video, audio, timing and control data which are packaged into various "packets". A packet is a group of binary digits that include data and control elements which are switched and transmitted as a composite whole. The data, control elements and other information are arranged in various specific formats.

Examples of such formats are disclosed in the ISO/IEC international Standards 11172 (1994) (generally referred to as MPEG-1) and 13818 (Jan. 20, 1995 draft) (generally referred to as MPEG-2), which are incorporated herein in their entirety by reference. In general, MPEG defines a packet as consisting of a header followed by a number of contiguous bytes from an "elementary data stream". An elementary stream is simply a generic term for one of the coded video, coded audio or other coded bitstreams. More specifically, a MPEG-2 "transport stream" packet comprises a header, which may be four (4) or more bytes long with a payload having a maximum length of 184 bytes. Transport stream packets are part of one or more programs which are assembled into a transport stream. The transport stream is then transmitted over a channel with a particular transfer rate.

Thus, in order to monitor and evaluate the status of a transport stream in real time, a method or apparatus must be able to handle the high transfer rate of the transmission channel. To illustrate, if data from the transport stream is arriving at a rate of 5 Mega-bytes per second and a processing unit operates at 20 Mega-instructions per second, then the processing unit must perform, on average, a READ operation every fourth instruction. This requirement is computationally expensive and increases the cost of performing real time packet analysis. In fact, since time is such a scarce resource in real time packet analysis, it may become prohibitively expensive. Although it may be more cost effective to capture the data in the transport stream into storage and then analyze the data at a later time, the benefit of real time analysis is lost. These benefits may include the detection of packet framing errors, jitters, inconsistent time base information or network wide errors that may affect a plurality of channels.

Therefore, a need exists in the art for a method and apparatus for performing real time packet analysis without the associated high computational expense. Specifically, a need exists for a method and apparatus for detecting errors, verifying the consistencies of time base information and displaying important packet stream information.

SUMMARY OF THE INVENTION

The present invention is a method and apparatus for analyzing and monitoring packet streams. The apparatus, a packet analyzer, comprises an input buffer, a real-time analysis unit, a non-real-time analysis unit, a graphics unit and a monitor. A packet stream is received into the input buffer where the data is read by the real-time analysis unit. Messages are passed between the real-time analysis unit and the non-real-time analysis unit to report on detected errors or to update packet stream information. In turn, real time packet stream information are displayed and updated on a display via the graphic unit.

The present invention incorporates a method of detecting framing errors in a packet stream by setting a 9th bit in the input buffer for each byte of data in a packet. Depending on this 9th bit value and the position of its associated byte of data (i.e., first byte in the packet, second, third, or etc.), the packet analyzer is able to detect packet framing errors, such as long packet, short packet, or bad data.

The present invention also minimizes the number of bytes that are processed by the real-time analysis unit by implementing a "flushing" circuit and method. This flushing method distinguishes payload carrying scrambled data in video and audio packets from those packets carrying important control data such as adaptation information relating to time base. Since the access of scrambled data is often limited, they provide little information in packet analysis except for the fact that a packet of this type has been transmitted and received. As such, the data bytes in such packets are flushed from the input buffer, thereby reducing significantly the number of bytes of data that the real-time analysis unit must process.

Furthermore, the present invention incorporates a plurality of methods in verifying the consistency of time base information. Specifically, the difference in program clock reference (PCR) values, the bit rate between PCR values and the difference in the arrival time of the PCR values are compared in different combinations with each other to determine the degree of PCR jitter in the packet stream.

Finally, various packet stream information are grouped and shown on a display for monitoring the packet stream. The displayed information are grouped in a manner to easily alert an operator as to potential problems in a packet stream or a network of packet streams.

BRIEF DESCRIPTION OF THE DRAWINGS

The teachings of the present invention can be readily understood by considering the following detailed description in conjunction with the accompanying drawings, in which:

FIG. 6 illustrates a flowchart of a second method for verifying the consistency of time base information in a transport stream;

FIG. 7 illustrates a flowchart of a third method for verifying the consistency of time base information in a transport stream;

To facilitate understanding, identical reference numerals have been used, where possible, to designate identical elements that are common to the figures.

DETAILED DESCRIPTION

Figure 1:
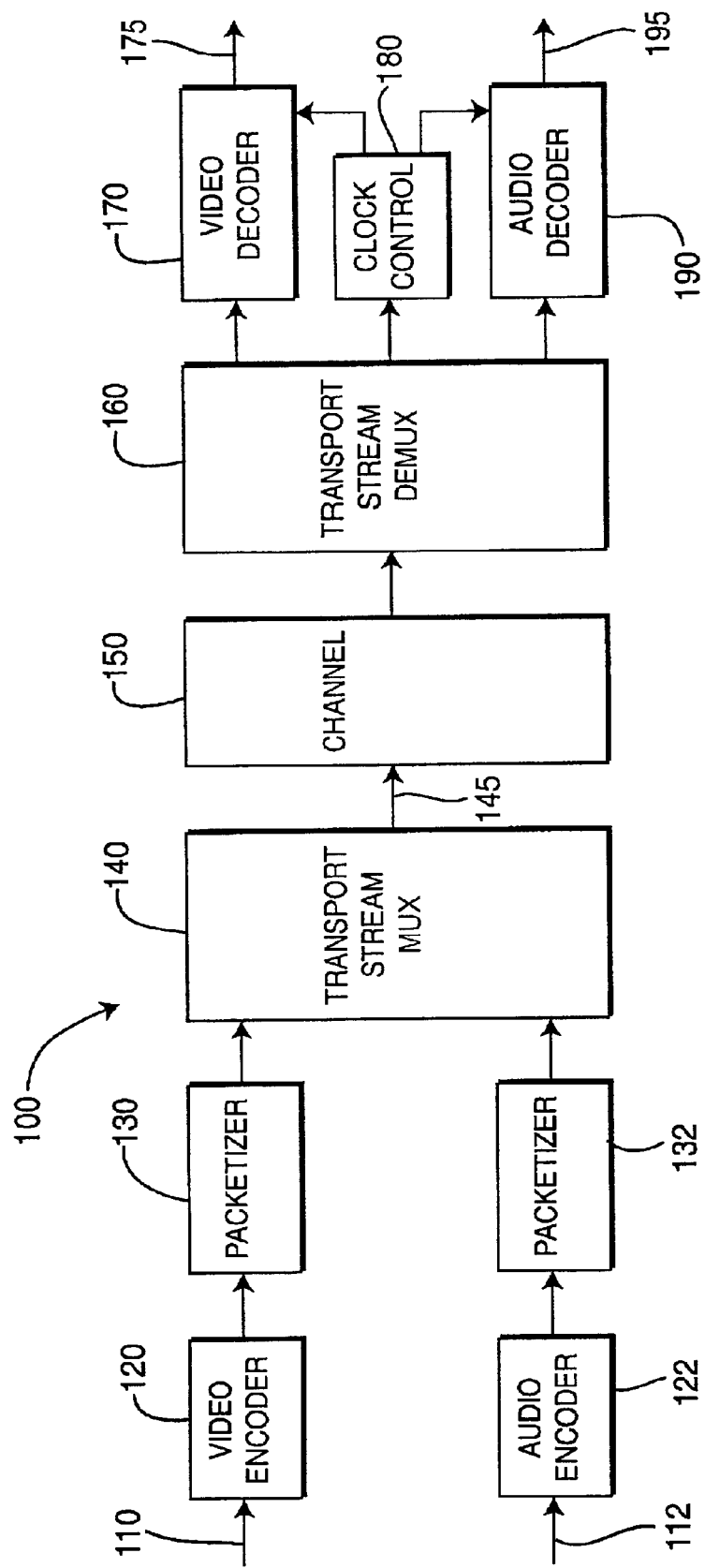
FIG. 1 illustrates a block diagram of a simplified conventional packet stream system.

FIG. 1 depicts a block diagram of a simplified structure of a conventional packet stream system 100. More specifically, a "transport stream" as defined in accordance with the MPEG standards is used in the packet stream system illustrated in FIG. 1. Although the present invention is described below using the MPEG transport stream as an example, those skilled in the art will realize that the present invention can be applied to any packet streams, i.e., a MPEG "program stream" or any other packet streams in accordance with other formats.

System 100 includes a video encoder 120 for receiving and encoding video data on path 110 into an elementary video bitstream. Similarly, the system also includes an audio encoder 122 for receiving and encoding audio data on path 112 into an elementary audio bitstream. In turn, these bitstreams are sent to packetizers 130 and 132 where the elementary bitstreams are converted into packets. Information for using the packets independently of the transport stream may be added when the packets are formed. Thus, non-audio/video data are allowed, but they are not shown in FIG. 1.

The packets are received and multiplexed by the transport stream multiplexor 140 to produce a transport stream 145. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 145 is transmitted over a transmission channel 150, which may further incorporate separate channel specific encoder and decoder (not shown). Next, the transport stream 145 is demultiplexed and decoded by a transport stream demultiplexor 160, where the elementary streams serve as inputs to video decoder 170 and audio decoder 190, whose outputs are decoded video signals on path 175 and audio signals on path 195 respectively.

Furthermore, timing information is also extracted by the transport stream demultiplexor 160 and delivered to clock control 180 for synchronizing the video and audio decoders with each other and with the channel. Synchronization of the decoders with the channel is accomplished through the use of the "Program Clock Reference" (PCR) in the transport stream. The PCR is a time stamp encoding the timing of the bitstream itself and is used to derive the decoder timing.

Figure 2:
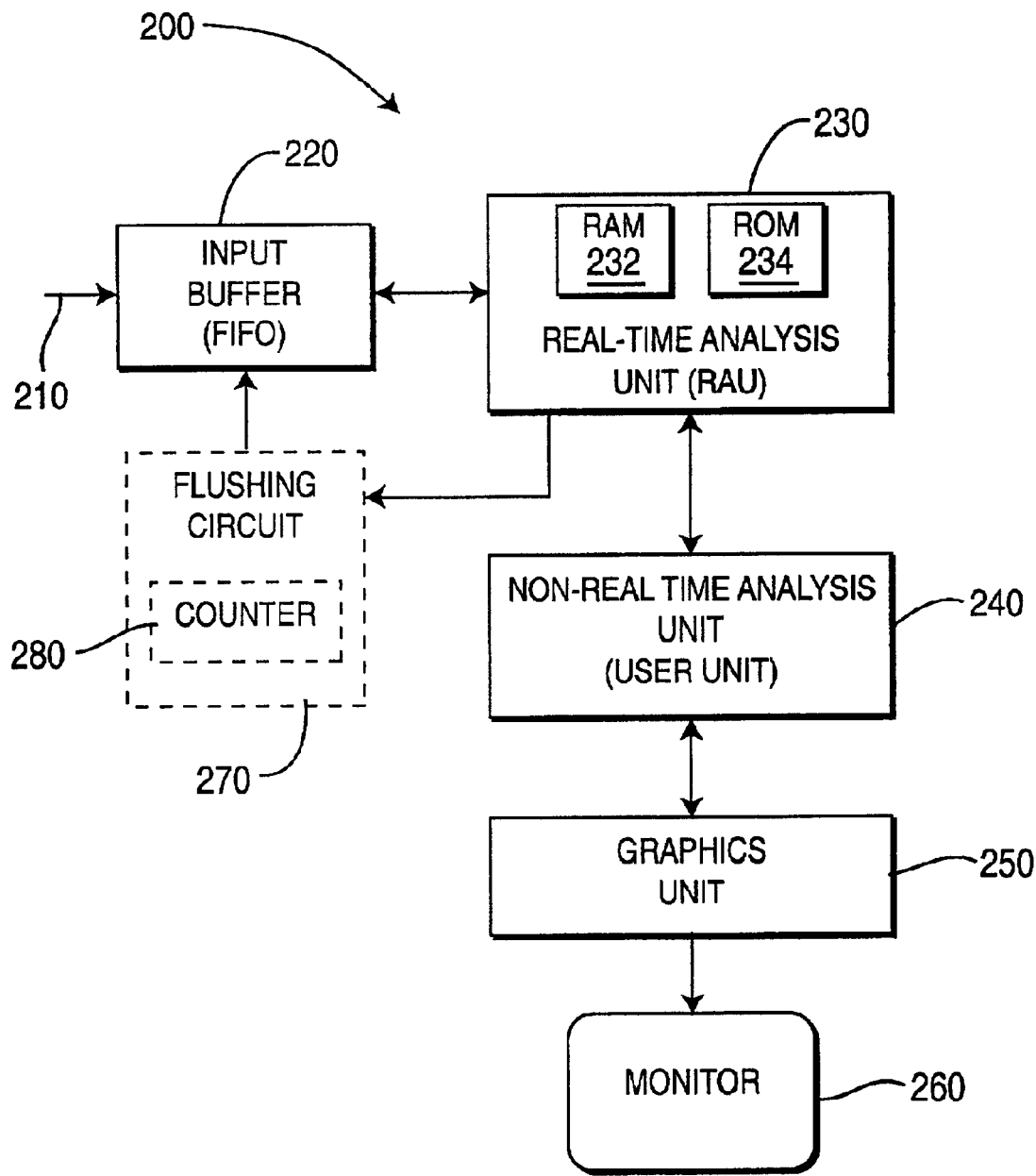
FIG. 2 illustrates a packet analyzer of the present invention for performing real time packet analysis.

FIG. 2 illustrates a packet analyzer 200 of the present invention for monitoring and performing real time packet analysis on a multiplexed bitstream, such as a MPEG-2 transport stream. The packet analyzer comprises an input buffer 220, a real-time analysis unit (RAU) 230, a non-real-time analysis unit (User Unit) 240, a graphics unit 250, a monitor 260 and an optional flushing circuit 270.

A transport stream on path 210 is received into the input buffer 220 in a byte-wide manner. In the preferred embodiment, the input buffer is a First-In-First-Out buffer (FIFO) having a length of 512 bytes and a width of 9 bits. A conventional circuitry, i.e., a controller (not shown) detects the start of a packet signal and begins the process of loading bytes into the FIFO. Since data is arriving at a steady rate, the FIFO serves to buffer the incoming data from a processing unit such as the RAU 230, thereby relieving the RAU from a rigid data processing schedule. The FIFO bits are organized as 8 data bits and one bit flag (9th bit). This 9th bit flag is used for packet framing and/or transmission of the "DVALID" flag information (packet status information) as discussed below. DVALID is defined as a signal which indicates correct detection of the signal at the output of the channel (150). For example, DVALID would be negated if a forward error correction code decoder in the channel failed to correct a channel error. DVALID is asserted at the beginning of each packet as an indication of that packet's validity.

Although the FIFO is illustrated as a separate unit, those skilled in the art will realize that the FIFO can be implemented in different manners, e.g., within the RAU 230. Similarly, although the present invention incorporates a one bit flag, those skilled in the art will realize that the flag can be implemented with more than a single bit.

The packet analyzer includes a RAU 230 for processing the packets stored in the FIFO. The RAU consists of a microcomputer, such as a TMS320C31 available from Texas Instruments, Inc., with the associated random access memory (RAM) 232 and read only memory (ROM) 234. The RAU may optionally incorporate other storage media, e.g., various disk drives (not shown). The RAU also contains a dual-port memory interface for communicating with the User Unit 240. Due to the high data transfer rate of the channel, the RAU serves as a dedicated processing unit in performing real time packet analysis.

The User Unit 240 is a general purpose computer, such as a Personal Computer with an Intel 80486 central processing unit (CPU). The User Unit 240 may optionally incorporate random access memory (RAM) and other storage media such as read only memory (ROM) and various disk drives (not shown). The User Unit executes a plurality of software applications such as Microsoft Windows which allows a software application to send and receive messages. To illustrate, the messages can be sent via a dual port memory scheme over a high-speed interface such as an ISA bus. Messages are sent between the User Unit and the RAU via interrupts. The User Unit serves to process the messages from the RAU and causes the results of the packet stream analysis to be displayed on the monitor 260 through a conventional graphics unit 250, such as a VGA graphics card.

Finally, the packet analyzer may incorporate an optional flushing circuit 270 for removing unwanted packets from the FIFO 220. The flushing circuit incorporates a counter 280 which is controlled and set by the RAU to a particular value, X. As the counter decrements from X to zero, an X number of bytes is flushed from the FIFO, thereby reducing the computational expense of performing real time packet analysis, which is discussed below with reference to FIG. 4. Various methods of flushing a FIFO are known, i.e., advancing a read pointer in the FIFO or simply reading the FIFO without sending the data to any destinations. The flushing circuit 270 is optional to the extent that it can be implemented as a hardware circuit (programmable logic arrays) or as a software algorithm. In the preferred embodiment, the flushing circuit is implemented as a hardware circuit. However, those skilled in the art will realize that the flushing circuit can be implemented as a software algorithm within the RAU.

The specific structure of the packet analyzer 200 as illustrated in FIG. 2 is used to implement a plurality of methods for analyzing and monitoring packet streams.

Figure 3:
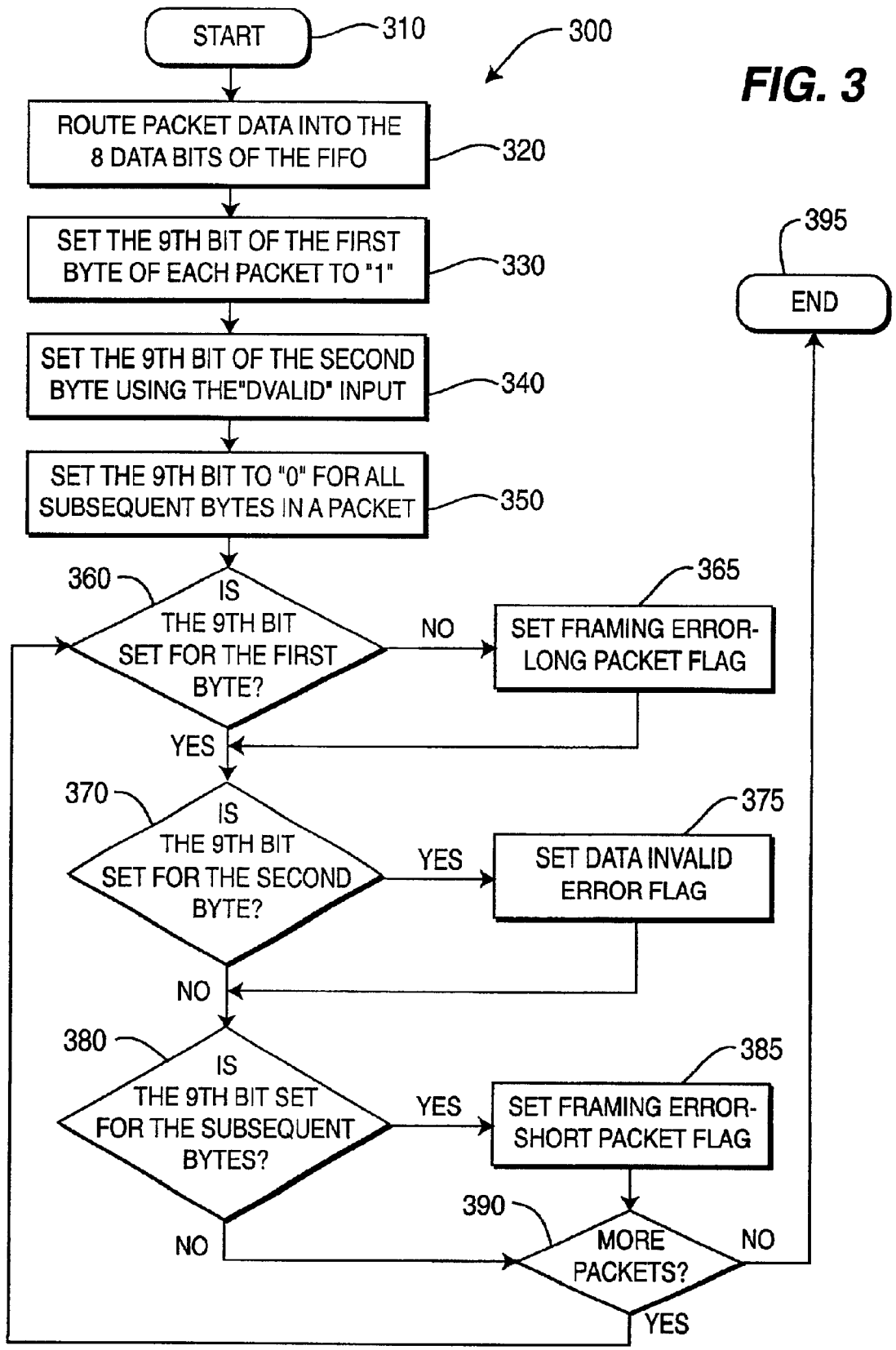
FIG. 3 illustrates a flowchart of a method for detecting packet framing errors within a transport stream.

FIG. 3 illustrates a method 300 for detecting packet framing errors within a transport stream. Generally, packet framing data consists of information about the numerical order of bytes in a packet (i.e., a first byte in the packet, a second byte in the packet, . . . ,etc.). The packet framing data is received into the FIFO at a steady rate such as every 188 clock cycles.

However, framing errors may occur where the boundary between successive packets are incorrectly defined, i.e., having too many bytes assigned to a packet (long packet error) or having too few bytes assigned to a packet (short packet error). Other framing errors may include invalid data (data invalid error) in a particular byte of a packet. When a framing error occurs, it is desirable to detect the framing error in the proper sequence. Namely, if a FIFO contains 10 packets and a packet framing error is suddenly triggered, then the framing error will appear 10 packets in the future. This premature alarm is undesirable because the processing unit such as the RAU will not be able to respond to the error until many cycles later, thereby adding additional computational overhead in tracking the framing error. Thus, it is preferable to have the framing error reported when the packet arrives.

FIG. 3 illustrates a method for detecting and presenting packet framing errors to the RAU. Referring to FIG. 3, the method 300 begins at step 310 and proceeds to step 320 where packet data is received and routed into the 8 data bits of the FIFO 220.

In step 330, the first byte of all packets receives a "start-of-packet" indicator as it is loaded into the FIFO 220. In the preferred embodiment, the start-of-packet indicator is implemented by setting the 9th bit of the first byte of a packet to a value of "1". This will indicate to the RAU that the current byte is the start of a new packet.

In step 340, the second byte of all packets receives a "data valid" indicator as it is loaded into the FIFO 220. In the preferred embodiment, the data valid indicator is implemented by multiplexing the existing "DVALID" signal into the 9th bit of the second byte of a packet. In MPEG, the DVALID is a flag used for indicating errors in the transmitted data. Thus, it is efficient to simply multiplex this existing indicator into the 9th bit of the second byte of a packet. A DVALID value of "1" indicates that a data invalid error exists within the packet, while a DVALID value of "0" indicates that the data in the packet is valid.

However, those skilled in the art will realize that other systems, i.e., non-MPEG systems, may incorporate other methods of indicating errors in the transmitted data. Such methods may include a dedicated wire to signal to the system that erroneous data is being transmitted and that the system should ignore these data bits. As such, these other indicators can be multiplexed for setting the 9th bit of a second byte of the packet to indicate data invalid errors in the transmitted packet.

In step 350, all other bytes of each packet receive a "short-packet" indicator as they are loaded into the FIFO 220. The short-packet indicator is implemented by setting the 9th bit of all subsequent bytes of a packet to a value of "0". This will indicate to the RAU that the current byte is not the start of a new packet.

In step 360, method 300 determines whether the 9th bit of the first byte of a packet is correctly set at the value of "1". In the preferred embodiment, the RAU reads a byte from the FIFO in a memory-mapped fashion, while relying on the controller of the FIFO (or a state machine) to read the 9th bit of the associated byte. The controller verifies that the first byte of every packet is read from one address, "FIRST ADDRESS" and that all other bytes are read from "NEXT ADDRESS". If the decision is affirmatively answered in step 360, then method 300 proceeds to step 370 where the current byte is confirmed as the start of a new packet. If the decision is negatively answered, method 300 proceeds to step 365 where a "framing error-long packet" flag is set, indicating a framing error within the packet. Since a read is being performed at the FIRST ADDRESS, the RAU expects the current byte to be the start of a new packet. If that is not the case, then the current packet is considered to be part of the previous packet, thereby erroneously increasing the length of the previous packet.

In step 370, method 300 determines whether the 9th bit of the second byte of a packet is set at the value of "0". If the decision is affirmatively answered, then method 300 proceeds to step 380 where the current packet is deemed to be carrying valid data. If the decision is negatively answered, method 300 proceeds to step 375 where a "data invalid error" flag is set, indicating a data error within the packet. This may cause the RAU to flush or ignore the bytes of the current packet.

In step 380, method 300 determines whether the 9th bit of the subsequent bytes of a packet is correctly set at the value of "0". If the decision is affirmatively answered for all subsequent bytes, then method 300 proceeds to step 390 where the current packet is confirmed to be correctly framed. If the decision is negatively answered, method 300 proceeds to step 385 where a "framing error-short packet" flag is set, indicating a framing error within the packet. Since a read is being performed at the NEXT ADDRESS, the RAU does not expect the current byte to be the start of a new packet. If that is not the case, then the current packet is considered to have ended too soon, thereby erroneously decreasing the length of the current packet.

In step 390, method 300 determines whether there are additional packets in the FIFO. If the decision is affirmatively answered, method 300 returns to step 360 and the steps of 360 through 380 are repeated for the next packet. If the decision is negatively answered, method 300 ends in step 395.

Figure 4:
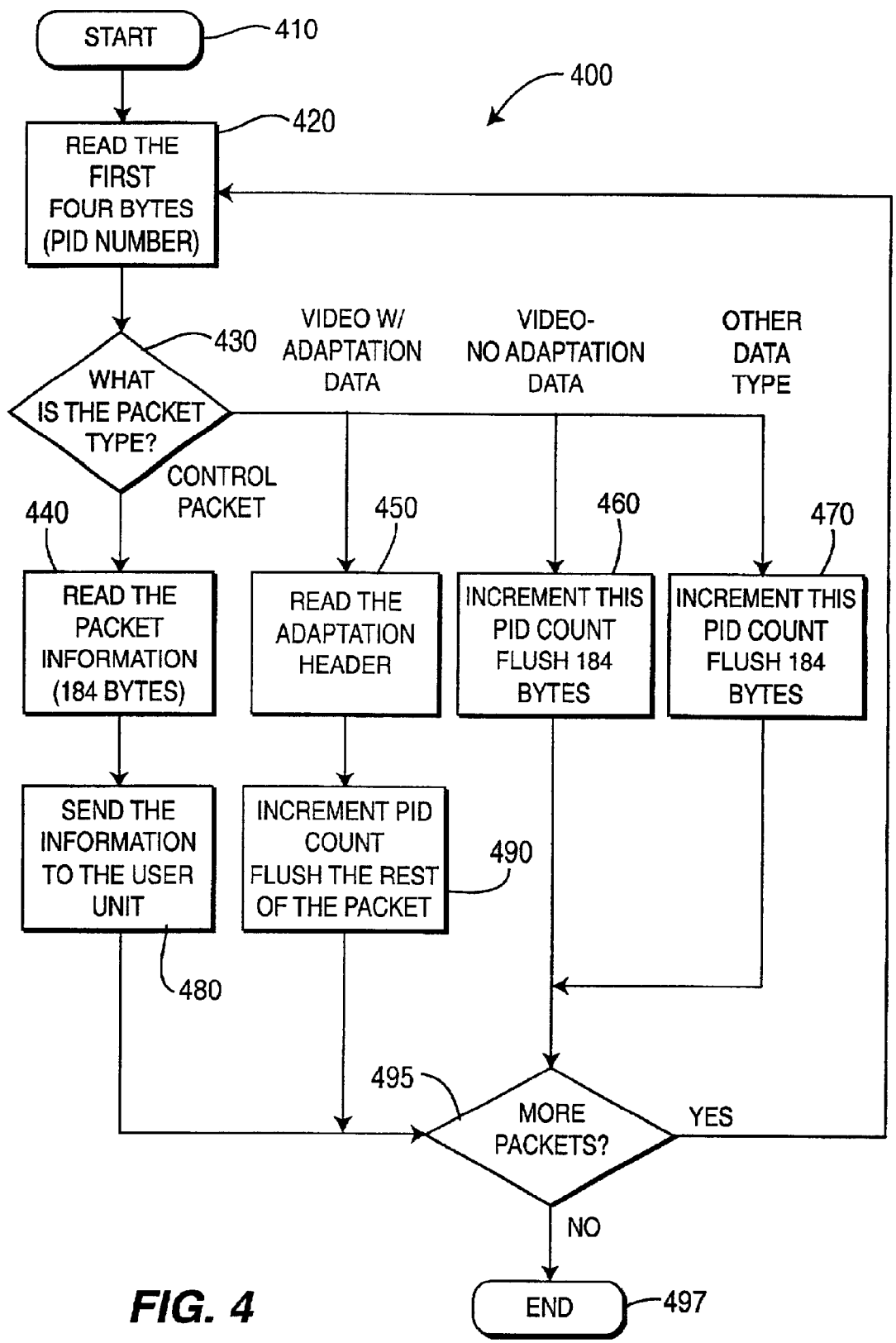
FIG. 4 illustrates a flowchart of a method for detecting and flushing payloads carrying scrambled data in the video and audio packets.

FIG. 4 illustrates a method for minimizing the number of bytes that are processed by the RAU by "flushing" payloads carrying scrambled data in the video and audio packets. In a MPEG-2 transport stream, the packets contain a header, which may consist of four (4) or more bytes, and a payload having any length up to 184 bytes. Since all packets are not of the same type, some packets carry video or audio data while other carry control streams. Since the payloads of video and audio packets are often scrambled, these packets provide little information to the RAU except for the fact that they have been transmitted and received. As such, the data bytes in such packets are flushed from the input buffer, thereby reducing significantly the number of bytes of data that the RAU must process.

The flushing method must distinguish payload carrying scrambled data in video and audio packets from those packets carrying important control data such as adaptation information relating to time base. Specifically, the control stream, "Program Association Table" (PAT), contains the important information on the location of other control streams in the form of "Packet Identifier" (PID) values. A PID is a unique 13 bit field, indicating the type of data that is stored in the packet payload. The PID values of 0 and 1 are reserved for the PAT and the "Conditional Access Table" (CAT) respectively.

Another important control stream is the "Program Map Tables" (PMT), which contains a list of PIDs and defines whether a PID carries video, audio, or "other data" in its payload. Thus, in order to determine the content of a packet payload, the PAT and PMT must be decoded before a packet stream's PID can be determined. Since PID values do not change very often, the PAT is sent at a low data rate and successive transmissions of the PAT typically contain identical data. Thus, once a PID is determined, it can be used repeatedly to determine the payloads of its packets, thereby permitting the RAU to flush various payloads from the FIFO to conserve precious CPU cycles. Since both the RAU and the User Unit incorporate some storage media, e.g., RAM or disk drives, both unit will maintain various tables to track packet information, e.g., PID values, number of received packets and/or time base information as they are received.

Referring to FIG. 4, the method 400 begins at step 410 and proceeds to step 420 where the first four bytes of a packet is read to determine its PID number or value. The first three bytes of a packet contain the "packet_start_code_ prefix" field, which is then followed by a fourth byte containing the "stream_id" field from which the PID is obtained.

In step 430, the method attempts to determine the packet type from the PID value extracted in step 420 by comparing the PID value with a look-up table. Initially, although the RAU is able to extract the PID number from the packet, it may not be able to determine which PIDs are associated with "flushable" payloads because the PAT and PMT may not have been received and decoded by the RAU or the User Unit. As such, a "Table of PID types" in the RAU is initially reset to "Other" for all PID values with the exceptions of PID values 0 and 1 which are reserved and defined by the MPEG standards. If the type of the packet cannot be determined, the RAU will process the header of the packet and its payload will be flushed by the FIFO.

When the User Unit is provided with the PAT and PMT, then the lists of PIDs and its associated stream types are decoded and forwarded to the RAU to update its Table of PID types. Thus, in step 430, the PID value is compared with the Table of PID types to determine its type with respect to four broad classifications.

If the method 400 determines from the PID value that a packet is a control stream packet in step 430, then the packet is sent to step 440 where the entire payload is read into the memory of the RAU and then sent to the User Unit via the dual-port RAM interface in step 480. The control information will be collected and displayed in various manners by the User Unit for evaluating the transport stream.

If the method 400 determines from the PID value that a packet is a video packet with adaptation data in step 430, then the packet is sent to step 450 where the adaptation header is read into the memory of the RAU. Video packets with adaptation fields are processed by reading the adaptation field where the first byte will define how many bytes must be read to obtain the adaptation data. Adaptation data is important because it often contains time base information such as Program Clock Reference (PCR). Again, the adaptation data is forwarded to the User Unit for evaluating the transport stream, but the remaining portion of the packet is then flushed from the FIFO and a counter for tracking the reception of this particular PID is also incremented to record its reception in step 490.

If the method 400 determines from the PID value that a packet is a video packet with no adaptation data in step 430, then the packet is sent to step 460 where the entire payload is flushed from the FIFO. Since such video packet often contains scrambled video data, the payload does not contain information that is relevant in evaluating the transport stream. As such, a counter for tracking the reception of this particular PID is also incremented to record its reception in step 460.

If the method 400 determines from the PID value that a packet belongs to "other data type" in step 430, then the packet is sent to step 470 where the entire payload is again flushed from the FIFO. Since these other data type packets often contain scrambled data or non-control-type data, the information contained in these payloads cannot be used to evaluate the transport stream. As such, a counter for tracking the reception of this particular PID is also incremented to record its reception in step 470.

In step 495, the method 400 determines whether there are additional packets in the FIFO. If the decision is affirmatively answered, method 400 returns to step 420 and the steps of 430 through 490 are repeated for the next packet. If the decision is negatively answered, method 400 ends in step 497.

In this manner, method 400 is able to minimize the number of FIFO read cycles that the RAU must perform. During the periods of time that the FIFO is being flushed, the RAU is able to utilize the conserved CPU cycles to pass or receive messages to and from the User Unit. Using the flush method 400, slightly more than 4 out of every 188 byte packets are read on average, thereby reducing the read cycle to approximately one read for every 188 instruction cycles (i.e., for a transport stream that is arriving at a rate of 5 Mega-bytes per second and a processing unit that is operating at 20 Mega-instructions per second).

Figure 5:
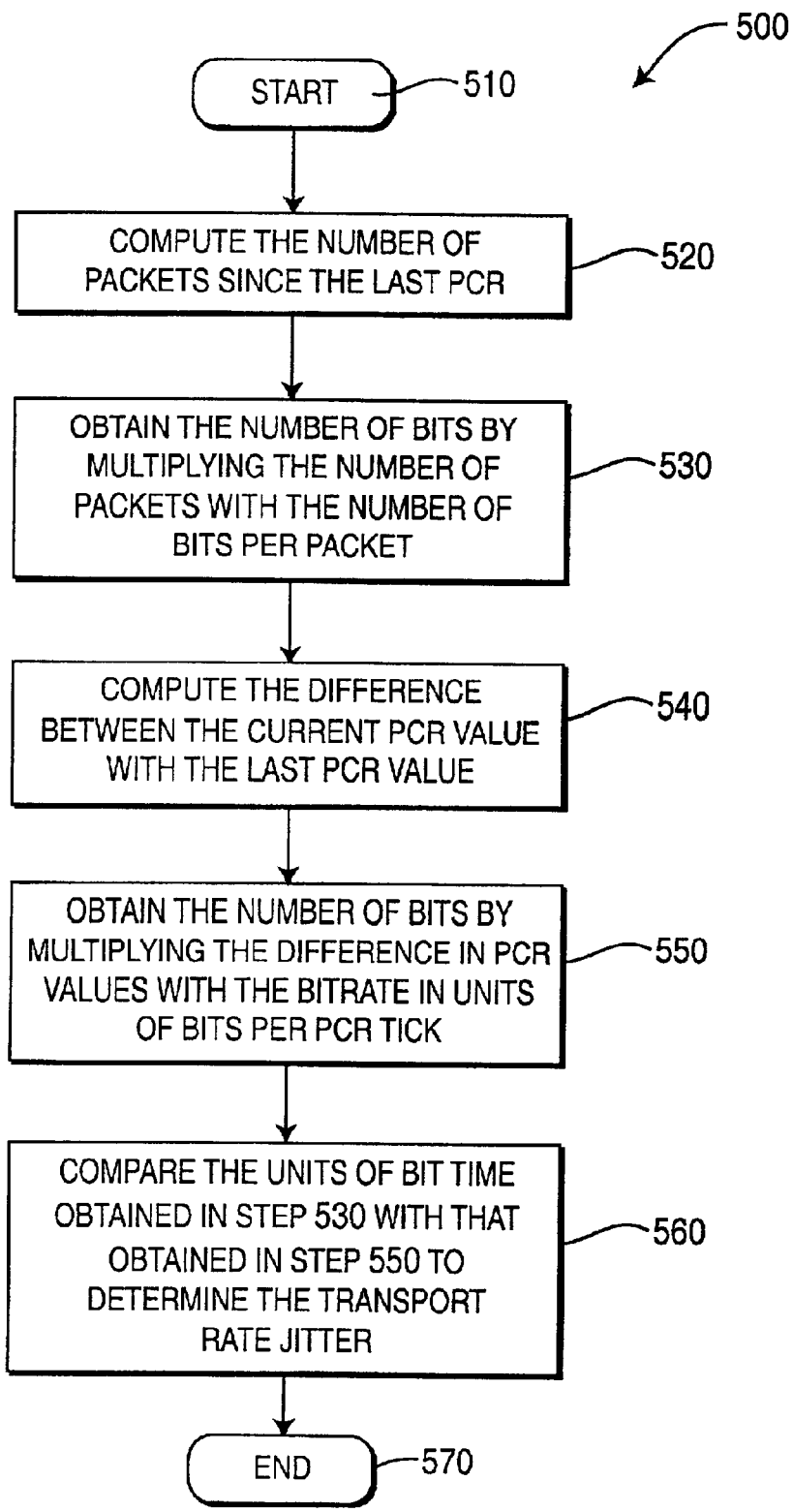
FIG. 5 illustrates a flowchart of a method for verifying the consistency of time base information in a transport stream.

FIG. 5 illustrates a method 500 for verifying the consistency of time base information in a transport stream. A transport stream may have a number of programs with each having a separate time base "clock". This creates the problem of measuring and verifying the consistency of the clocks on each of the programs. Each PID may contain adaptation sections for carrying PCR values, which are different from those of other PIDs. The MPEG standards require PCRs to advance with limited amount of jitter, since time base information is used by the decoder to maintain synchronization with the encoder. The time base information must be very accurate down to 500 nano-seconds.

The packet analyzer 200 is able to determine the correctness of PCRs by using entries in the PID data records to keep track of PCR related data. The PID data records are a 8192 entry table, in which each entry contains information about that PID. As discussed in FIG. 4, the Table of PID types may contain other information aside from the PID type of a packet. Other important entries include information about the arrival time of the PCRs which can be stored in a queue, the count of how many packets of a particular PID type have been received, including a total count of the number of packets received regardless of the PID number, and the received PCR values. Alternatively, some entries could be assigned from a pool of memory while the table could simply contain a pointer into the memory pool.

Referring to FIG. 5, the method 500 begins at step 510 and proceeds to step 520, where the method computes the number of packets received since the last PCR value. This net number of packets is then multiplied in step 530 with the number of bits per packet to produce a net number of bits.

In step 540, the method computes the difference between the current PCR value with the last PCR value. This net PCR time is then multiplied in step 550 with the bitrate in units of bits per PCR tick to produce a net number of bits.

In step 560, the method 500 computes the transport rate jitter by obtaining a discrepancy between net number of bits calculated in steps 530 and 550. The method then ends in step 570.

In effect, method 500 compares two values: the number of packets (and therefore the number of bits) since the last PCR, and the product of the bitrate times the difference between the last PCR and the current PCR. If the time base information is correct, then the product should match the number of bits, where the discrepancy is the jitter or error. Once the transport rate jitter is calculated, the jitter can be compared with a limit, added into an average, included into a histogram data file or sent to the User Unit for storage or display.

FIG. 6 illustrates a second method 600 for verifying the consistency of time base information in a transport stream. In this second method, a detector circuit is employed to record when a certain part of an incoming packet is present in the input to the FIFO 220. To illustrate, the detector should be able to detect the arrival of the 11th byte of a packet, which corresponds to the least significant bit of the program_clock_reference_base field. The detector should then simultaneously cause a counter value to be stored in a queue of Recorded PCR Values. The counter is clocked at a constant rate such that its value indicates time. In this fashion, it is not necessary to read the PCR values, but instead, the method places a "timestamp" associated with the packet in a queue.

Referring to FIG. 6, the method 600 begins at step 610 and proceeds to step 620, where the method computes the number of packets received since reception of the last PCR value. This net number of packets is then multiplied in step 630 with the number of bits per packet to produce a net number of bits.

In step 640, the method computes the difference between the current recorded PCR value with the last recorded PCR value. This net recorded PCR time is then multiplied in step 650 with the bitrate in units of bits per PCR tick to produce a net number of bits.

In step 660, the method 600 computes the transport rate jitter by obtaining a discrepancy between net number of bits calculated in steps 630 and 650. The method then ends in step 670.

In essence, method 500 is very similar to method 600, where the only difference is that method 500 uses the PCR values while method 600 uses the timestamps when the PCRs were actually received.

FIG. 7 illustrates a third method 700 for verifying the consistency of time base information in a transport stream. Referring to FIG. 7, the method 700 begins at step 710 and proceeds to step 720, where the method computes the difference between the current recorded PCR value with the last recorded PCR value. In step 730, the method computes the difference between the current PCR value with the last PCR value.

In step 740, the method 700 computes the transport rate jitter by obtaining a discrepancy between the time calculated in steps 720 and 730. The method then ends in step 750.

The present invention also provides a plurality of methods in viewing the details of a transport packet stream. The displayed information are grouped in a manner to easily alert an operator as to potential problems in a packet stream or a network of packet streams.

Figure 8:
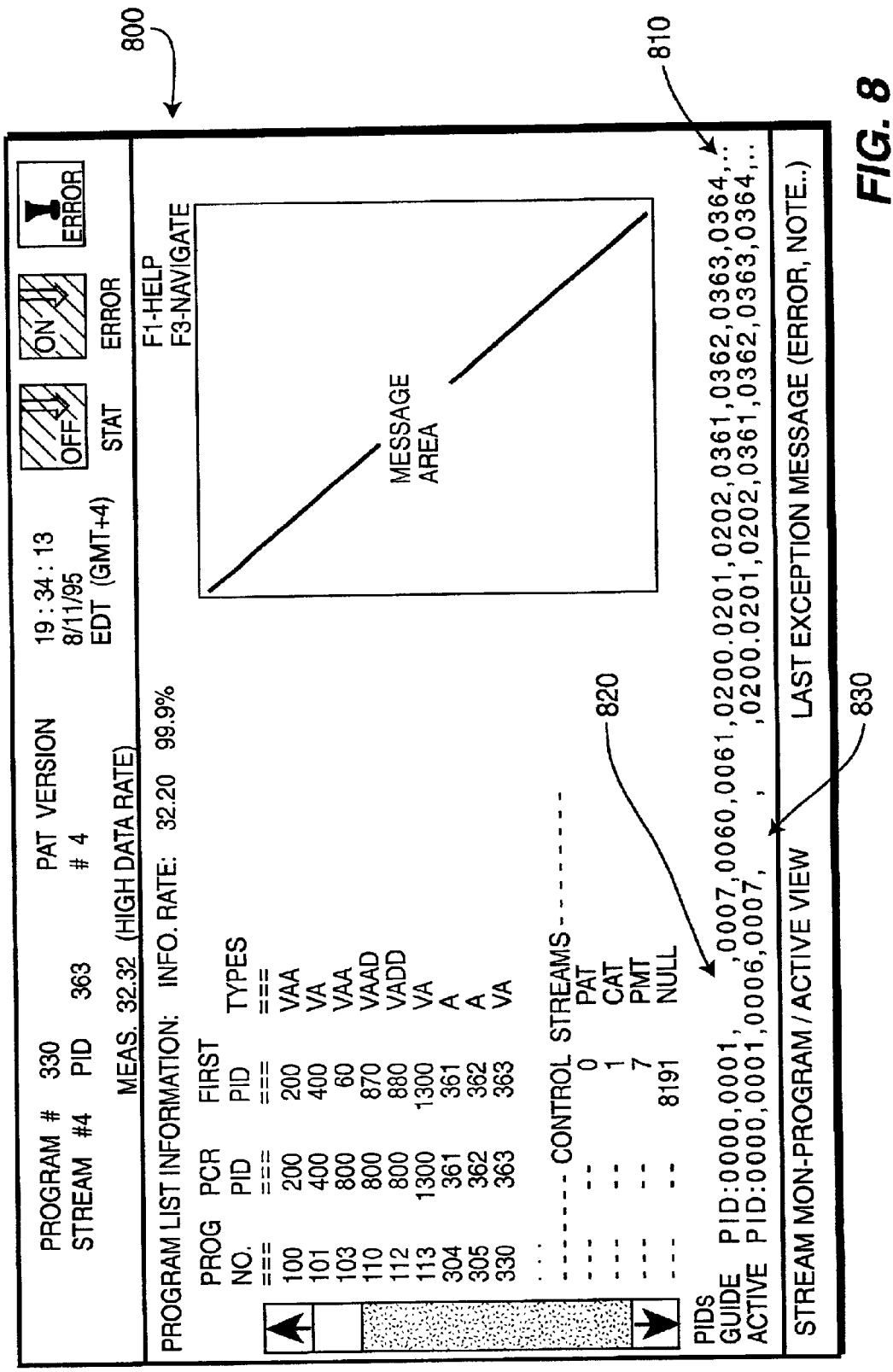
FIG. 8 illustrates a graphical interface display showing a program guide view.

FIG. 8 illustrates a graphical interface display 800 showing a program guide view. The interface display includes a display area 810 where "Guide PIDs" are compared with "Active PIDs". The Guide PIDs indicate the types of PIDs to be expected, while Active PIDs indicate the types of PIDs that are actually received. This particular arrangement of PID information provides a quick reference to match the two sets of PID data. If the transport stream is functioning properly, the two rows of data should contain identical numbers.

Specifically, display area 820 illustrates a missing PID value in the Guide PIDs row, while a PID value of 0006 is illustrated in the Active PIDs row. This indicates to an operator that a particular PID was not expected but yet it was received. In contrast, display area 830 illustrates missing PIDs in the Active PIDs row, while the PID values of 0060 and 0061 are illustrated in the Guide PIDs row. This indicates to an operator that a particular set of PIDs were expected but have yet to be received. Thus, graphical interface display 800 provides a quick and efficient method of monitoring the program guide.

Figure 9:
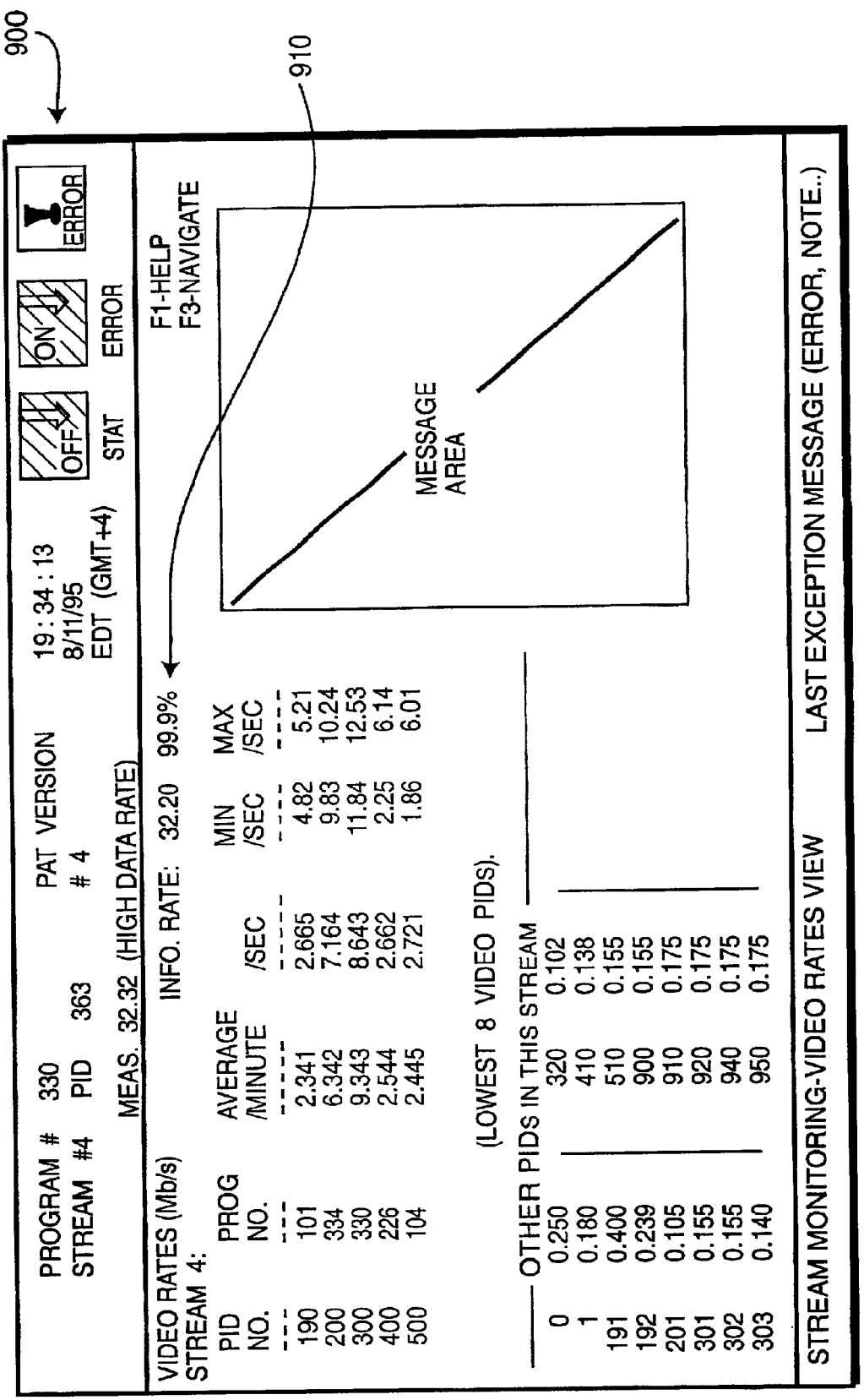
FIG. 9 illustrates a graphical interface display showing a video rates view.

FIG. 9 illustrates a graphical interface display 900 showing a video rates view. The interface display includes a display area 910 showing the percentage that is not nulled. Namely, this particular arrangement provides a quick reference as to bandwidth utilization. In this particular display, the operator can quickly gauge the bandwidth utilization to be 99.9%.

Figure 10:
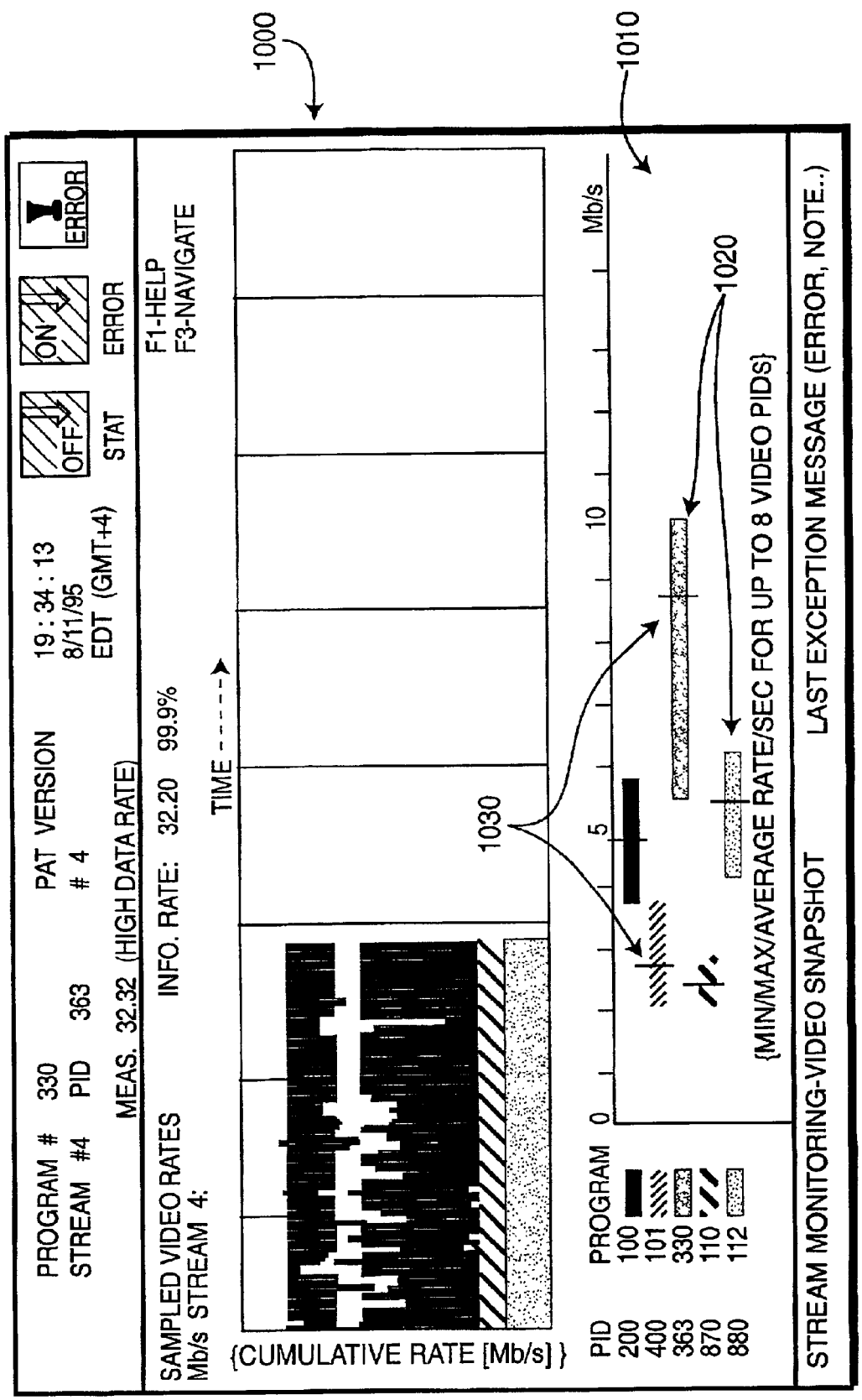
FIG. 10 illustrates a graphical interface display showing a video rates graph.

FIG. 10 illustrates a graphical interface display 1000 showing a video rates graph. The interface display includes a display area 1010 showing a plurality of "inch worm" graphs 1020. These inch worm graphs illustrate the minimum and maximum data rate for a plurality of different PIDs. Furthermore, an average line 1030 is provided for each inch worm graph to illustrates the average data rate for a specific PID. This particular arrangement provides effective method of showing real-time information regarding data rate. One benefit of this graphical interface display is the ability to evaluate whether PIDs are being sent evenly. In essence, an operator can easily gain some insight into the PID scheduling scheme, i.e., a method of evaluating the multiplexing algorithm of the system.

Figure 11:
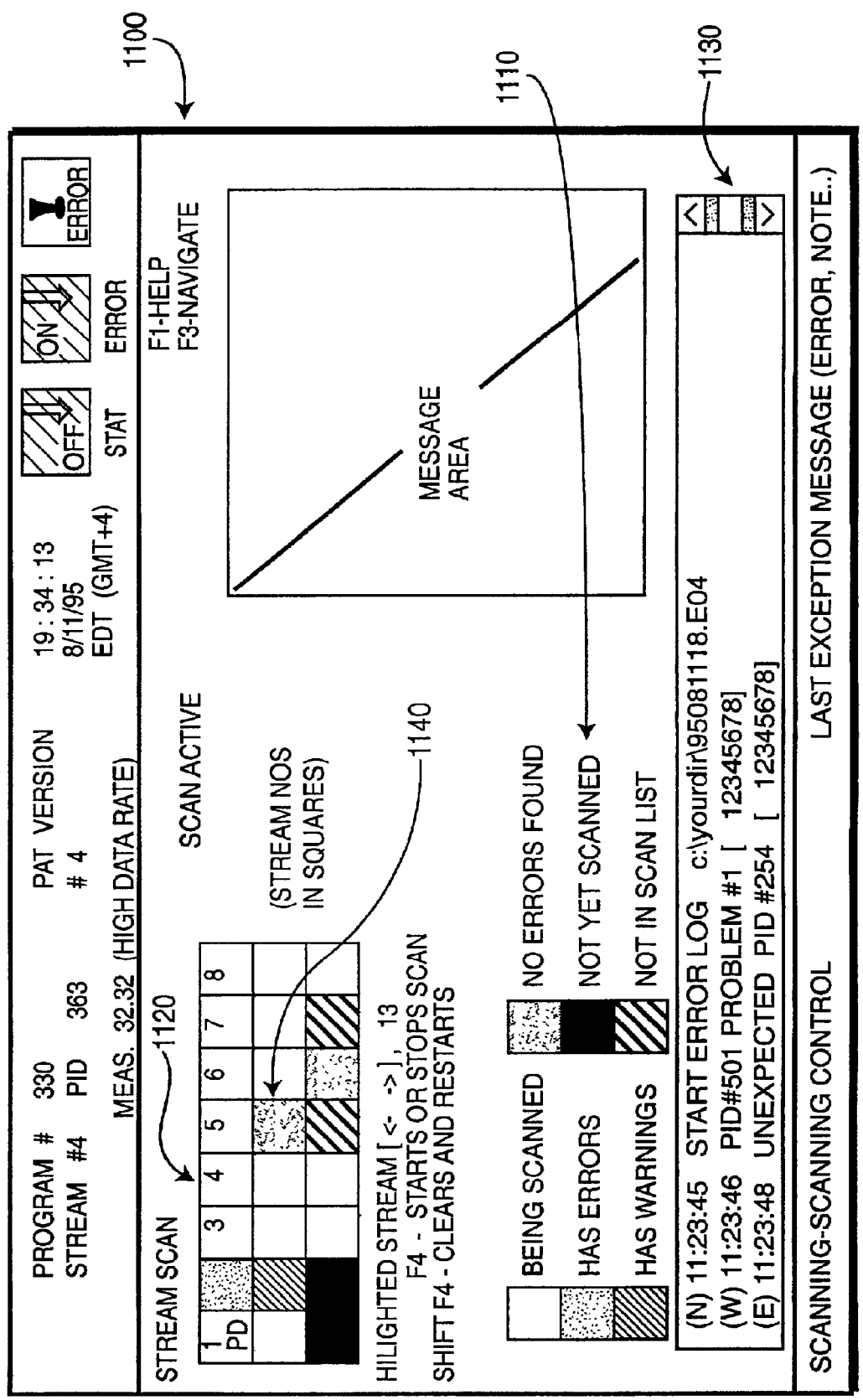
FIG. 11 illustrates a graphical interface display showing a multiplexed streams scan.

FIG. 11 illustrates a graphical interface display 1100 showing a multiplexed streams scan. The interface display includes a display area 1120 for showing the states of a plurality of multiplexed streams. Each stream being shown as a block. A display area 1110 shows a plurality of status patterns. These patterns may incorporate different colors or symbols within the block. A display area 1130 shows a record of detected problems for a selected multiplexed stream 1140.

There has thus been shown and described a novel method and apparatus for evaluating transport packet streams in "real time" for detecting errors, verifying the consistency of time base information and displaying important packet stream information. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Method for evaluating in real-time a packet stream having a plurality of packets, said method comprising the steps of:
   a) receiving the plurality of packets into a buffer;
   b) extracting a plurality of time base information from said plurality of packets;
   c) comparing said time base information to detect transport rate jitter; and wherein said extracting step (b) comprises the steps of:
      b1) computing a total unit of bit time by multiplying a number of received packets with a number of bits per packet; and
      b2) computing a total unit of bit time by multiplying a difference between a current program clock reference (PCR) value and a last PCR value with a bit rate in units of bits per PCR tick.

2. Method for evaluating in real-time a packet stream having a plurality of packets, said method comprising the steps of:
   a) receiving the plurality of packets into a buffer;
   b) extracting a plurality of time base information from said plurality of packets;
   c) comparing said time base information to detect transport rate jitter; and wherein said extracting step (b) comprises the steps of:
      b1) computing a total unit of bit time by multiplying a number of received packets with a number of bits per packet; and
      b2) computing a total unit of bit time by multiplying a difference between a current recorded program clock reference (PCR) value and a last recorded PCR value with a bit rate in units of bits per PCR tick.

3. A computer-readable medium having stored thereon a plurality of instructions, the plurality of instructions including instructions which, when executed by a processor, cause the processor to perform the steps comprising of:
   a) receiving the plurality of packets into a buffer;
   b) extracting a plurality of time base information from said plurality of packets;
   c) comparing said time base information to detect transport rate jitter; and wherein said extracting step (b) comprises the steps of:
      b1) computing a total unit of bit time by multiplying a number of received packets with a number of bits per packet; and
      b2) computing a total unit of bit time by multiplying a difference between a current program clock reference (PCR) value and a last PCR value with a bit rate in units of bits per PCR tick.

4. A computer-readable medium having stored thereon a plurality of instructions, the plurality of instructions including instructions which, when executed by a processor, cause the processor to perform the steps comprising of:
   a) receiving the plurality of packets into a buffer;
   b) extracting a plurality of time base information from said plurality of packets;
   c) comparing said time base information to detect transport rate jitter; and wherein said extracting step (b) comprises the steps of:
      b1) computing a total unit of bit time by multiplying a number of received packets with a number of bits per packet; and
      b2) computing a total unit of bit time by multiplying a difference between a current recorded program clock reference (PCR) value and a last recorded PCR value with a bit rate in units of bits per PCR tick.

5. Apparatus for evaluating in real-time a packet stream having a plurality of packets, said apparatus comprising:
   a buffer for receiving the plurality of packets;
   means for extracting a plurality of time base information from said plurality of packets;
   means for comparing said time base information to detect transport rate jitter; and
   wherein said extracting means computes a total unit of bit time by multiplying a number of received packets with a number of bits per packet, and computes a total unit of bit time by multiplying a difference between a current program clock reference (PCR) value and a last PCR value with a bit rate in units of bits per PCR tick.

6. Apparatus for evaluating in real-time a packet stream having a plurality of packets, said apparatus comprising:
   a buffer for receiving the plurality of packets;
   means for extracting a plurality of time base information from said plurality of packets;
   means for comparing said time base information to detect transport rate jitter; and
   wherein said extracting means computes a total unit of bit time by multiplying a number of received packets with a number of bits per packet, and computes a total unit of bit time by multiplying a difference between a current recorded program clock reference (PCR) value and a last recorded PCR value with a bit rate in units of bits per PCR tick.

* * * * *